Jan. 20, 1953     J. PLESTER     2,625,860
TOOL FOR SHAVING DOWN LOCAL PROTUBERANCES
Filed Jan. 3, 1951
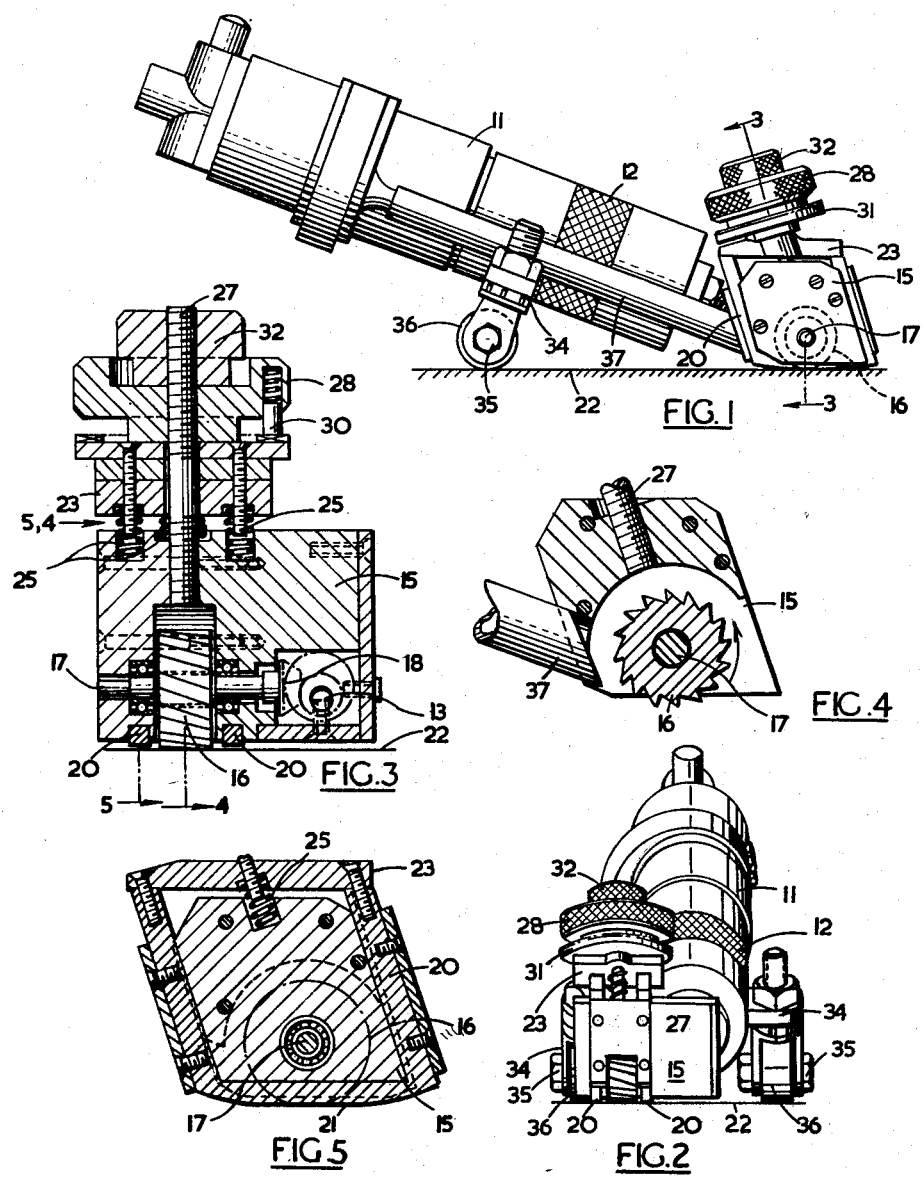
INVENTOR
JOSEPH PLESTER
By Mawhinney + Mawhinney
ATTYS.

Patented Jan. 20, 1953

2,625,860

UNITED STATES PATENT OFFICE 2,625,860

TOOL FOR SHAVING DOWN LOCAL PROTUBERANCES

Joseph Plester, Coventry, England, assignor to Sir W. G. Armstrong Whitworth Aircraft Limited, Baginton, Coventry, England Application January 3, 1951, Serial No. 204,120
In Great Britain March 22, 1950

4 Claims. (Cl. 90—12)

1

This invention relates to a tool for shaving down local protuberances from generally-flat surfaces—for example, for shaving down the heads of rivets, in an aerofoil surface, which are countersunk and are intended to be flush fitted, or to be proud to an extent of only a few thousandths of an inch.

British Patent Specification No. 624,264 discloses a tool which is very satisfactory for this purpose; but there is a difficulty at times in maintaining it in a stable position (generally at rightangles to the said surface) and in moving it properly along the surface. Also, it requires the use of a face milling cutter.

The main object of the present invention is to provide a satisfactory tool with which the above-mentioned disadvantage is obviated.

According to the invention, the tool includes an elongated body supporting a driving means (such as a pneumatic motor) for a spindle, a rotary cutter supported from the body, with its axis preferably at rightangles to the spindle axis, and connected to be driven by the spindle, an adjustable part carried by the body and positioned to engage the generally-flat surface and thereby limit the depth of cut, and two rollers or the like carried by the body, more remote from the cutter, to provide with the said part a stable multi-point support for the tool, from the said surface, in a position in which its body and spindle are at a relatively small angle (for example, of about 20°) to the said surface, and in which the cutter can shave down any protuberance to a predetermined extent.

In the accompanying drawings:

Figure 1 is a side elevation of a tool according to the invention;

Figure 2 is a front elevation;

Figure 3 is a sectional elevation, to a larger scale, taken on the line 3—3 of Figure 1; and Figures 4 and 5 are cross-sections taken on the lines 4—4 and 5—5, respectively, of Figure 3.

In the construction shown, an elongated pneumatic motor has its casing 11 secured to a casing 12 supporting a spindle 13 (Figure 3) coaxial with the motor, these two casings constituting, in effect, the body of the tool. Round the free end of the spindle, where it emerges from its casing, is secured to the casing a bracket 15 carrying a milling cutter 16 and its spindle 17, the bracket enclosing also an appropriate bevel or other rightangled drive 18 between the two spindles. The bracket is clear of the cutting face of the cutter, as shown most clearly by Figure 4.

2

Associated with each side of the cutter is a slide 20, 20 the operative faces 21 of which (either flat or curved convex) constitute the aforesaid adjustable part (which is positioned to engage the generally flat surface 22 and thereby set the extent of cut), the two slides being rigidly connected to one another, remote from their operative faces, by a bridging piece 23. Coil compression springs 25 react between the bridging piece 23 and the bracket 15 to force the bracket and hence the cutter downwards relative to the slides, and a screw threaded pin 27, fast in the bracket 15 and extending through the bridge piece 23 and fitted with a nut 28 which may be knurled, is adapted to lift the bracket 15 and cutter 16 relative to the slides, thus compressing the springs 25.

This screw and nut limit the extent of cut by appropriately setting the cutting edges of the cutter 16 relatively to the faces 21 of the slides.

It is obvious that instead of springs 25 rigid distance pieces can be used, which can be made adjustable by being adapted to be screwed in or out of the bracket 15 or the bridging piece 23, or other known means of spacing the bracket 15 from the bridging piece 23 may be used. Conveniently the nut 28 carries a spring pressed plunger 30 (Figure 3) adapted to have a "clicking" engagement with a serrated plate 31 fast with the bridging piece, whereby lightly to lock the nut angularly. A locking screw or the like 32 is also provided for locking purposes.

Secured to the underface of the casing 12 for the spindle of the pneumatic motor is a rigid transverse strip 34 supporting roller-carrying forks 35 at its ends, the two rollers 36 and the two operative faces 21 of the slides serving to provide a suitable multi-point suspension for the tool with the cutter in the operative position.

As described in the specification aforesaid, it is preferable to collect the exhaust gases from the motor and to transmit them along a pipe 37 leading to the cutter face, so as to remove swarf and the like.

It will be understood that, instead of a pneumatic motor, any other form of motor (e. g., electric or hydraulic) may be used.

What I claim as my invention and desire to secure by Letters Patent of the United States is:

1. A tool for shaving down local protuberances on a generally-flat surface, comprising a spindle, driving means for said spindle, an elongated body supporting said driving means and said spindle, a rotary cutter supported from said body, gearing interconnecting said cutter and said spindle, two slides carried by said body and respectively positioned adjacent each side of said cutter to engage said generally-flat surface, a bridging piece rigidly interconnecting said slides remotely from their operative faces, means acting on said bridging piece for simultaneously adjusting said slides relatively to said body whereby to limit the depth of cut, and two spaced supports carried by said body remote from said cutter to provide with the operative faces of said slides a stable multipoint support for the tool, from said surface, in a position in which said body and spindle are at a relatively small angle to the said surface and in which said cutter can shave down any protuberance to a predetermined extent.

2. A tool, according to claim 1, having spring means acting between said body and said adjustable part to impel said cutter relatively to said part to a position of deeper cut, and having a screw acting against said spring means to set the depth of the cut.

3. A tool for shaving down local protuberances on a generally-flat surface, comprising an elongated body, a bracket forming a detachable end portion of said body, a rotary cutter supported by said bracket, driving means for said cutter supported by said body, a slide at each side of said cutter supported by said bracket, said slides having smooth surfaces adjacent the operative cutting edge of said cutter, a bridging portion uniting said slides, springs reacting between said bridging portion and said bracket to impel said cutter relatively to said slides to a position of deeper cut, a screw fast with said bracket and extending through a clearance hole in said bridging portion, a nut on said screw adapted, when tightened, to react upon said bridging portion in opposition to said springs in order to set the depth of cut, and a pair of generally coaxial rollers carried by said body to provide a stable multi-point support for the tool upon the generally-flat surface.

4. A tool according to claim 3, having also a clicking means reacting between said nut and said bridging portion to lightly locate said nut angularly.

JOSEPH PLESTER.

REFERENCES CITED

The following references are of record in the file of this patent:

UNITED STATES PATENTS

| Number | Name | Date |
|---|---|---|
| 1,708,097 | Johnston | Apr. 9, 1929 |
| 1,848,817 | Aurand | Mar. 8, 1932 |
| 1,874,220 | Aurand | Aug. 30, 1932 |

FOREIGN PATENTS

| Number | Country | Date |
|---|---|---|
| 624,264 | Great Britain | June 1, 1949 |
| 644,011 | Germany | Apr. 22, 1937 |